US008531400B2

(12) United States Patent
Campbell et al.

(10) Patent No.: US 8,531,400 B2
(45) Date of Patent: Sep. 10, 2013

(54) FOOT-OPERATED MOUSE

(76) Inventors: Frank W. Campbell, Lake Elmo, MN (US); Timothy J. Kelley, Stillwater, MN (US)

(*) Notice: Subject to any disclaimer, the term of this patent is extended or adjusted under 35 U.S.C. 154(b) by 140 days.

(21) Appl. No.: 13/025,811

(22) Filed: Feb. 11, 2011

(65) Prior Publication Data
US 2012/0206356 A1 Aug. 16, 2012

(51) Int. Cl.
G09G 5/08 (2006.01)

(52) U.S. Cl.
USPC .................................... 345/163; 345/166

(58) Field of Classification Search
USPC ................................................ 345/156–167
See application file for complete search history.

(56) References Cited

U.S. PATENT DOCUMENTS

| 4,817,950 | A | * | 4/1989 | Goo | 463/36 |
| 5,392,532 | A | * | 2/1995 | Bray et al. | 36/11.5 |
| 5,841,426 | A | | 11/1998 | Dodson et al. | |
| 5,886,685 | A | * | 3/1999 | Best | 345/163 |
| 6,611,250 | B1 | * | 8/2003 | Prince et al. | 345/163 |
| 6,975,303 | B2 | * | 12/2005 | Dalsey | 345/163 |
| 6,980,133 | B2 | * | 12/2005 | Foong | 341/20 |
| 7,369,116 | B2 | | 5/2008 | Logue | |
| 7,554,526 | B2 | | 6/2009 | Logue | |
| 7,692,632 | B2 | | 4/2010 | Logue | |
| 7,811,217 | B2 | * | 10/2010 | Odien | 482/147 |
| 8,081,162 | B2 | * | 12/2011 | Teoh et al. | 345/166 |
| 2003/0124923 | A1 | * | 7/2003 | Mercer | 441/74 |
| 2007/0097077 | A1 | * | 5/2007 | Ishikawa et al. | 345/163 |
| 2008/0129683 | A1 | * | 6/2008 | Li | 345/156 |
| 2009/0170449 | A1 | * | 7/2009 | Xiao | 455/90.1 |
| 2011/0084902 | A1 | | 4/2011 | Logue | |
| 2012/0081285 | A1 | * | 4/2012 | Atzmon | 345/163 |

OTHER PUBLICATIONS

RADTECH®, BT500 Rechargeable Bluetooth Wireless Mouse for Mac and PC [online] [retrieved on May 4, 2011] retrieved from the internet: <http://www.radtech.us/products/BT500.aspx>, 4 pages.

* cited by examiner

Primary Examiner — Hong Zhou
(74) Attorney, Agent, or Firm — IPLM Group, P.A.

(57) ABSTRACT

A foot operated mouse for use on a surface comprises a housing including a heel portion, a toe portion, a pivot member, and a sensor mechanism. The pivot member is configured and arranged to contact the surface and allow the housing to pivot between an operating position and a nonoperating position. The operating position is when the sensor mechanism is proximate the surface, and the nonoperating position is when the sensor mechanism is pivoted upward away from the surface.

23 Claims, 21 Drawing Sheets

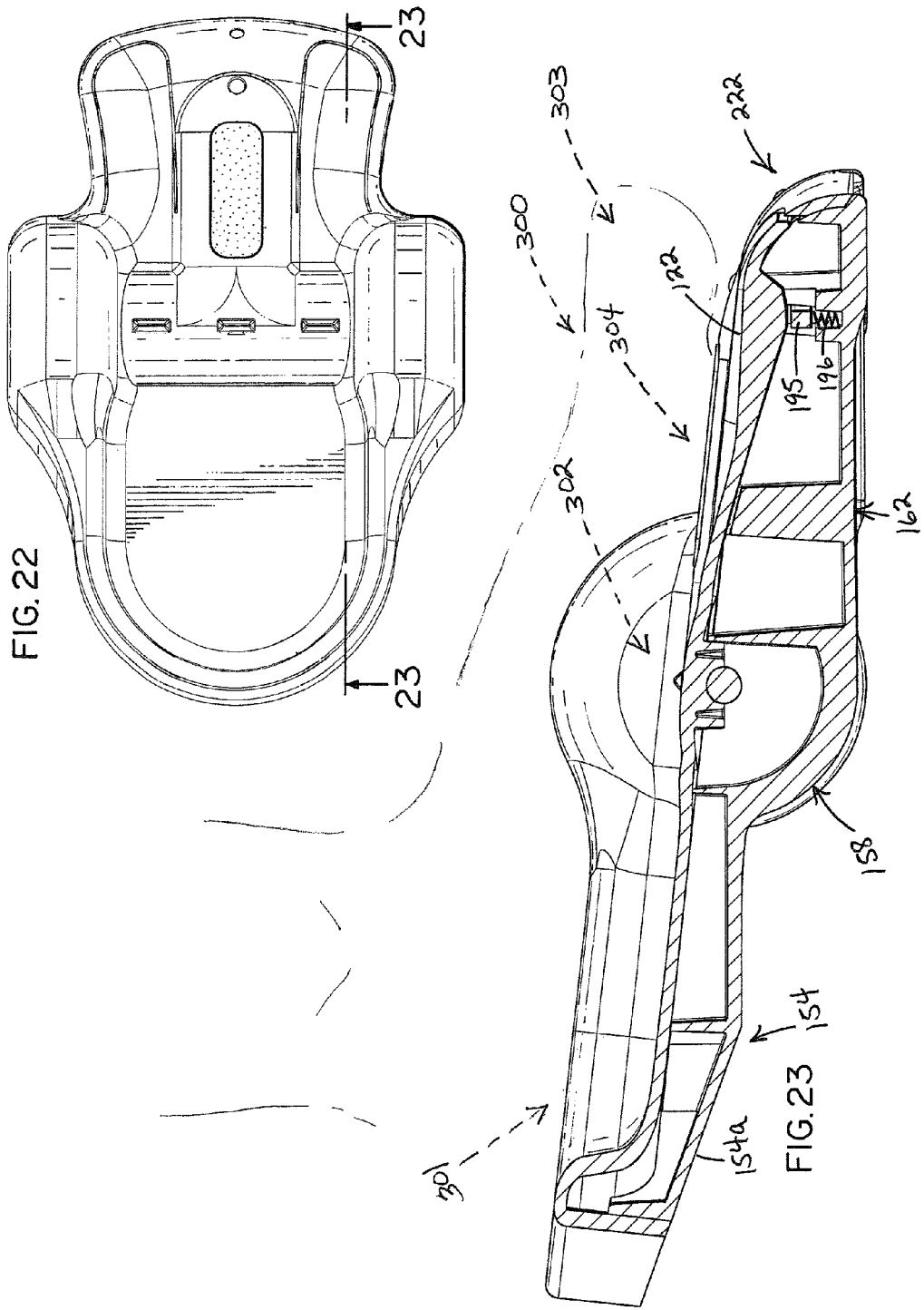

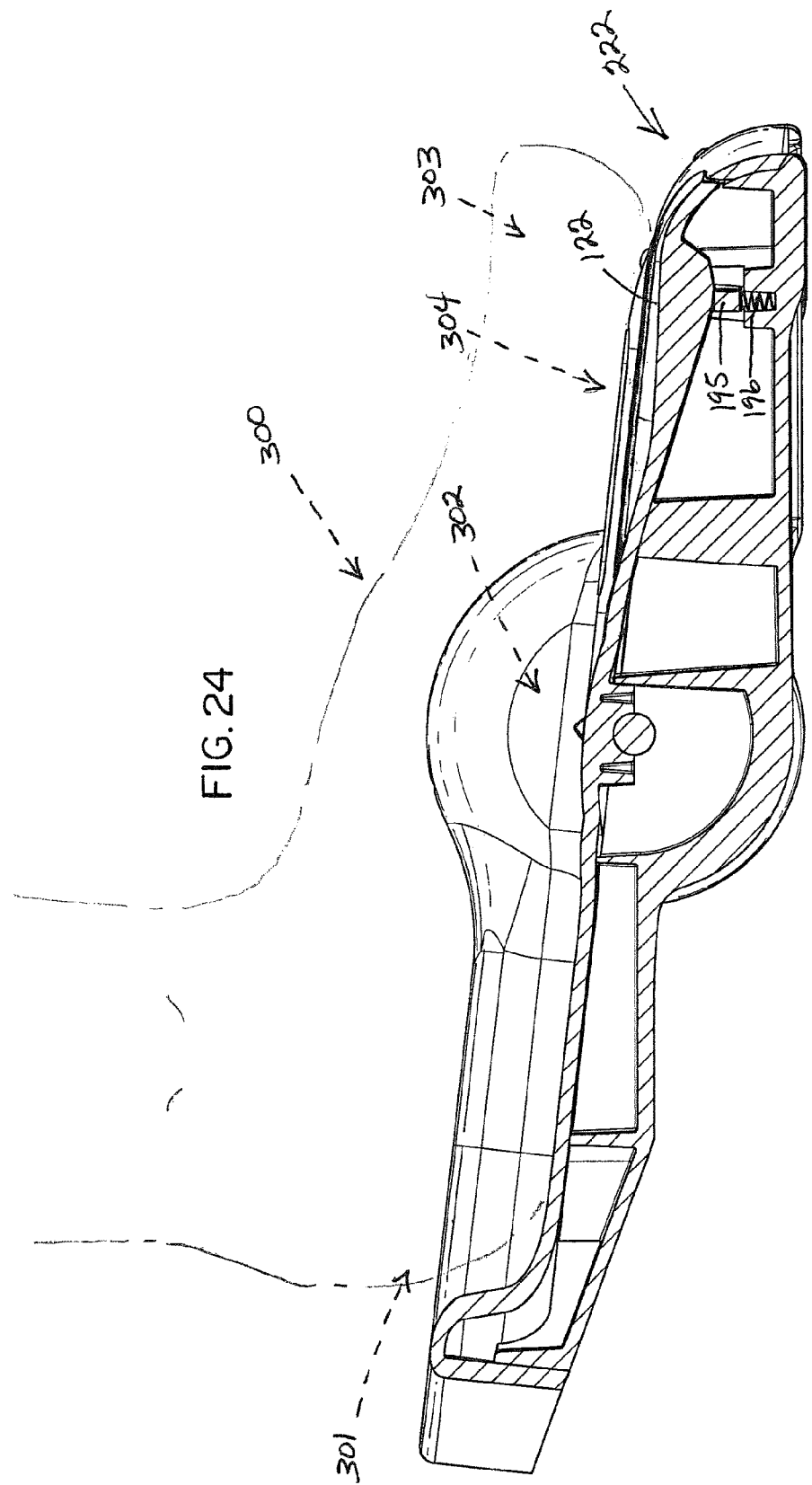

FOOT-OPERATED MOUSE

BACKGROUND OF THE INVENTION

Foot operated mouse type controls for computers are desirable for use in a variety of applications such as clean room environments in which hands free operation is desired including, but not limited to, medical and dental offices. Operation of prior foot operated mouse type controls is generally not intuitive and the user must learn how to use them efficiently.

For the reasons stated above and for other reasons stated below, which will become apparent to those skilled in the art upon reading and understanding the present specification, there is a need in the art for a more user friendly foot operated mouse.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a foot operated mouse for use on a surface comprises a housing including a heel portion, a toe portion, a pivot member, and a sensor mechanism. The pivot member is configured and arranged to contact the surface and allow the housing to pivot between an operating position and a nonoperating position. The operating position is when the sensor mechanism is proximate the surface, and the nonoperating position is when the sensor mechanism is pivoted upward away from the surface.

In one embodiment, a foot operated mouse for use on a surface comprises a housing including an intermediate portion interconnecting a heel portion and a toe portion. The toe portion includes a sensor mechanism and a wheel mechanism is operatively connected to the housing proximate the intermediate portion. The wheel mechanism rotates relative to the housing, and the wheel mechanism is configured and arranged to contact the surface and allow the housing to pivot between an operating position and a nonoperating position. The operating position is when the toe portion and the sensor mechanism are proximate the surface, and the nonoperating position is when the toe portion is pivoted upward away from the surface.

In one embodiment, the foot operated mouse comprises a housing and a wheel mechanism. The housing includes an intermediate portion interconnecting a heel portion and a toe portion. The toe portion includes a right button, a left button, and a sensor mechanism. The wheel mechanism is operatively connected to the housing proximate the intermediate portion and is configured and arranged to rotate relative to the housing. The wheel mechanism is configured and arranged to contact the surface and allow the housing to pivot between an operating position and a nonoperating position. The operating position is when the toe portion and the sensor mechanism are proximate the surface, and the nonoperating position is when the toe portion is pivoted upward away from the surface. In a method of operating a foot operated mouse on a surface, a user's foot having a heel, an instep, and toes is placed on the housing with the user's heel proximate the heel portion, the user's instep proximate the intermediate portion, and the user's toes proximate the toe portion. Pressure is placed on the toe portion with the user's foot proximate the user's toes so that the toe portion and the sensor mechanism are proximate the surface to position the mouse in an operating position. The user's foot is moved to press one of the right and left buttons.

BRIEF DESCRIPTION OF THE DRAWINGS

The present invention can be more easily understood, and further advantages and uses thereof can be more readily apparent, when considered in view of the detailed description and the following Figures in which:

FIG. 22 is a top view of the foot operated mouse shown in FIG. 1;

FIG. 23 is a cross-section view of the foot operated mouse generally taken along the line 23-23 in FIG. 22 with a right button, an actuator, and a right controller button in an upward position and a user's foot shown in phantom lines; and FIG. 24 is a cross-section view of the foot operated mouse similar to FIG. 23 with the right button, the actuator, and the right controller button in a downward position and a user's foot shown in phantom lines.

In accordance with common practice, the various described features are not drawn to scale but are drawn to emphasize specific features relevant to the present invention. Reference characters denote like elements throughout the Figures and the text.

DETAILED DESCRIPTION OF THE INVENTION

Figure 1:
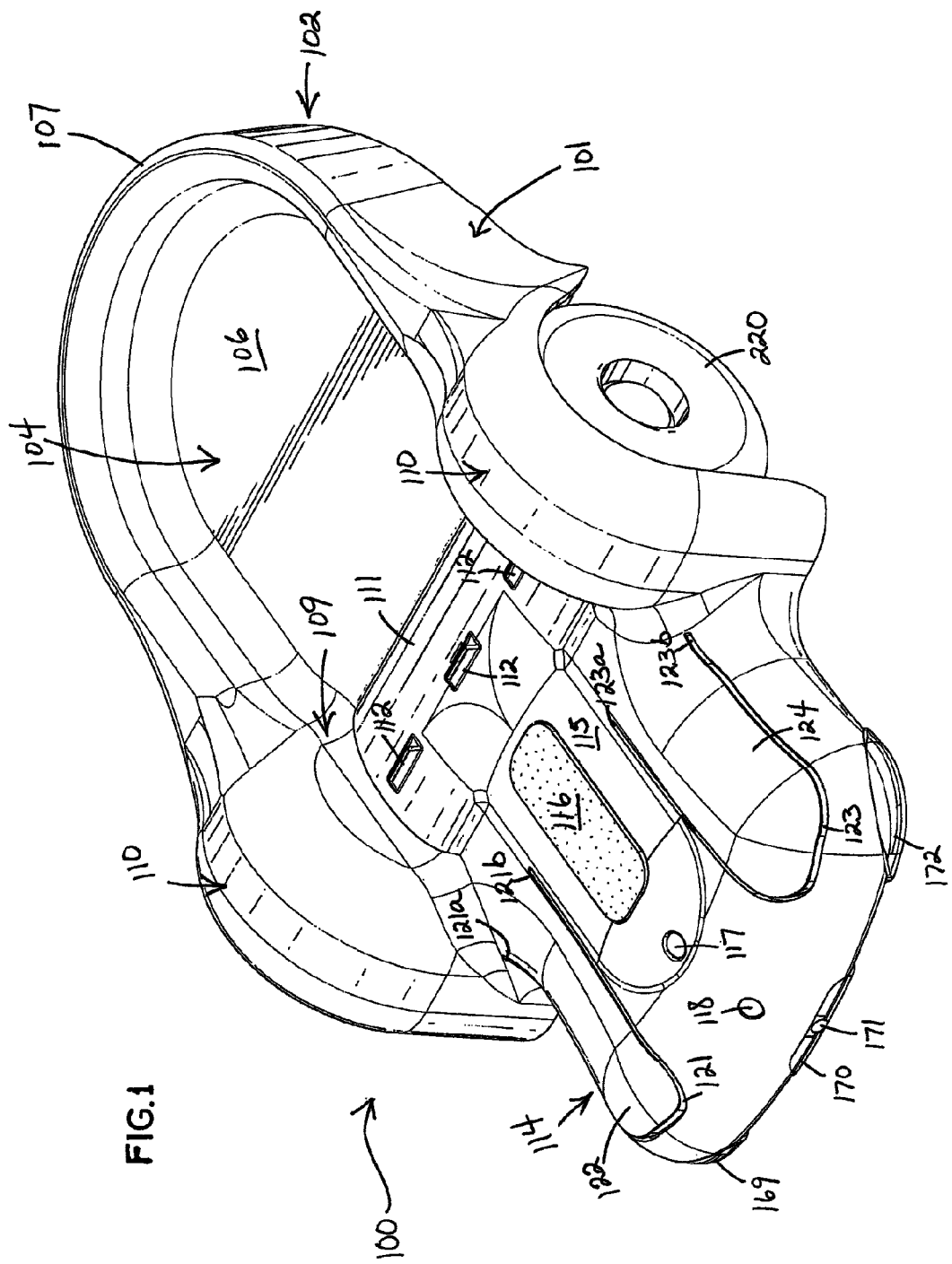
FIG. 1 is a top perspective view of a foot operated mouse constructed in accordance with the principles of the present invention.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

An embodiment foot operated mouse constructed in accordance with the principles of the present invention is designated by the numeral 100 in the drawings. The foot operated mouse 100 generally comprises a housing, which includes a cover 101 and a base 150, and a pivot member 218.

Figure 14:
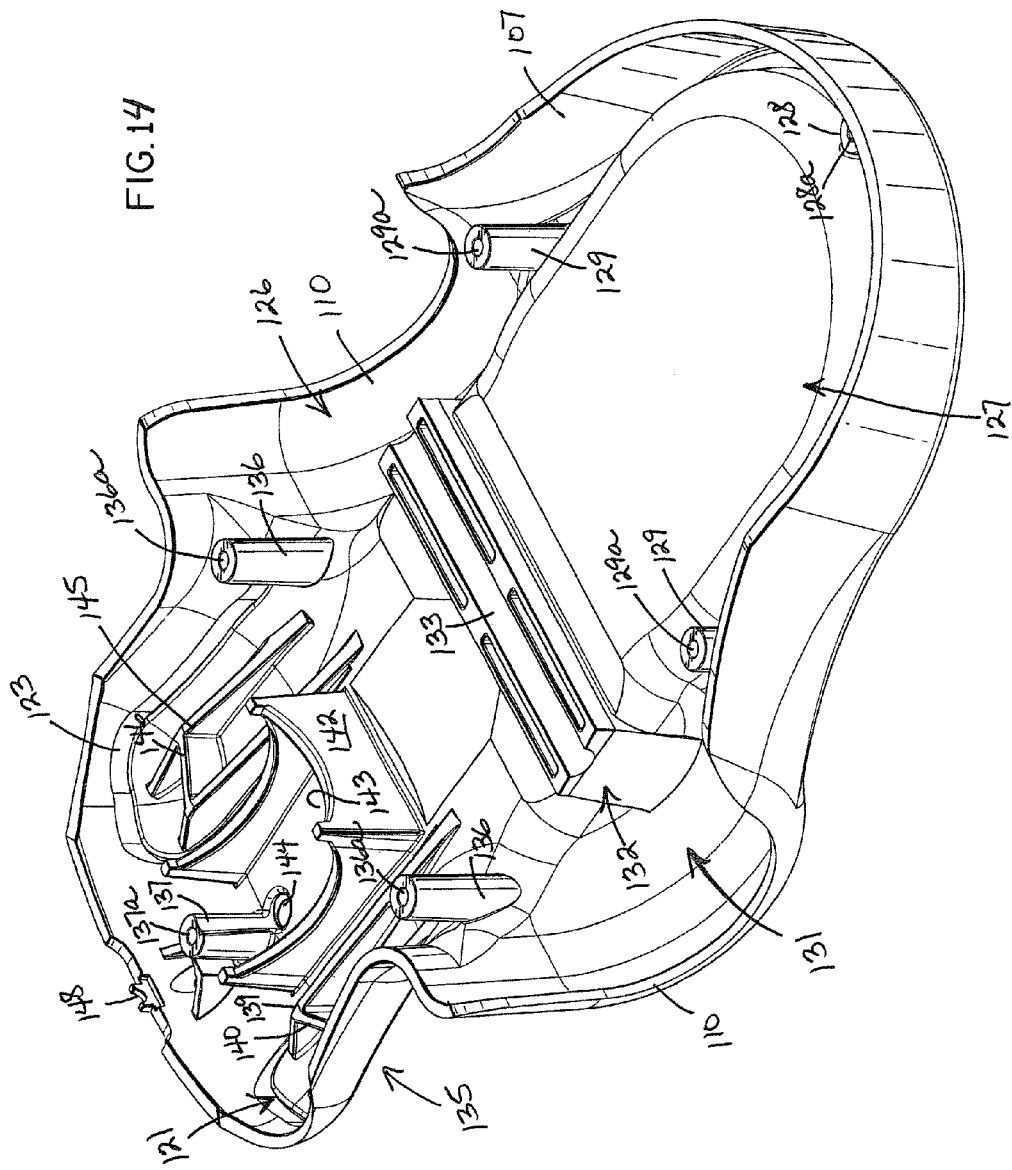
FIG. 14 is a bottom perspective view of the cover excluding the controller, batteries, and the wheel mechanism shown in FIG. 12.
Figure 15:
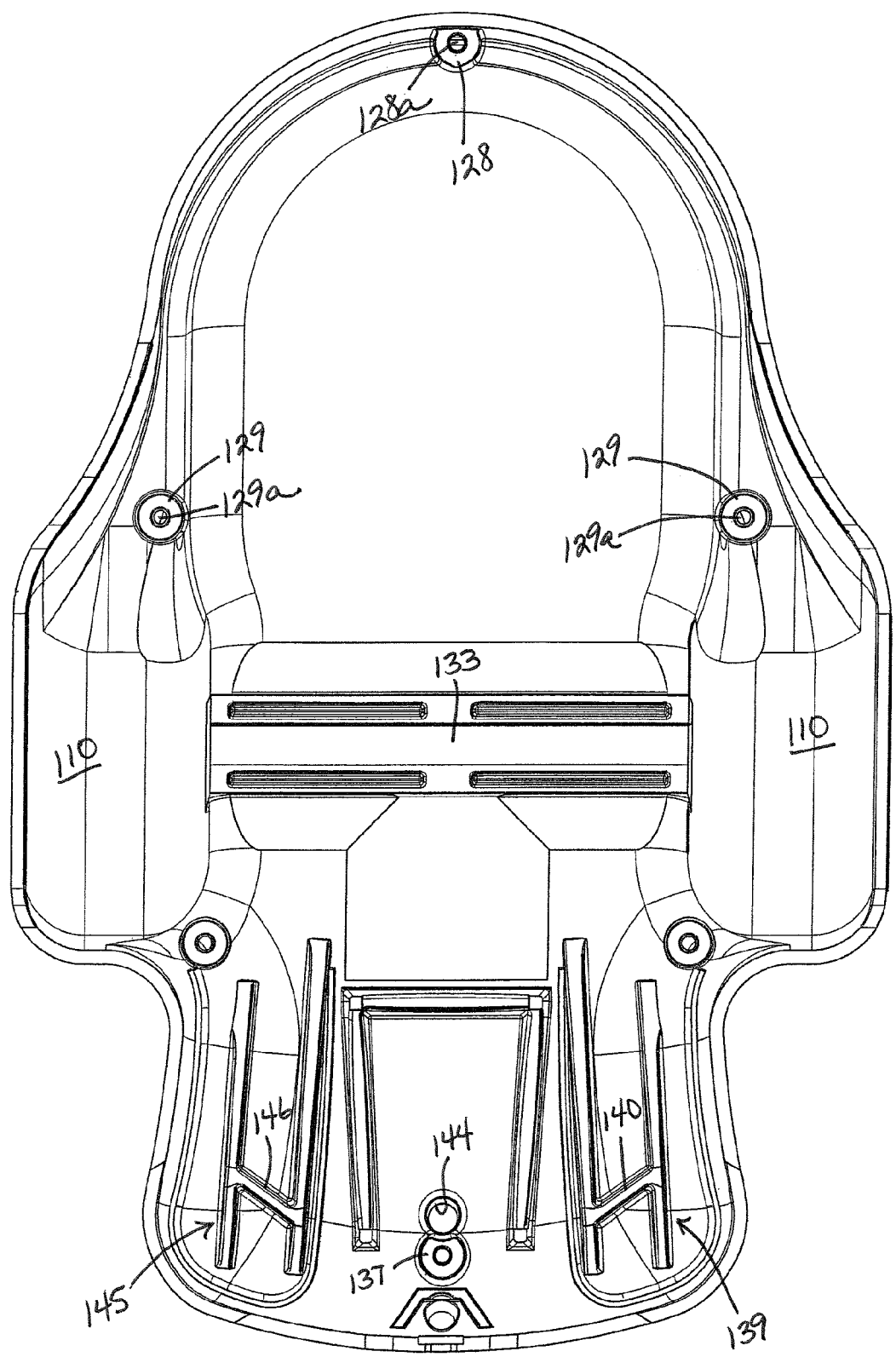
FIG. 15 is a bottom view of the cover shown in FIG. 13.
Figure 16:
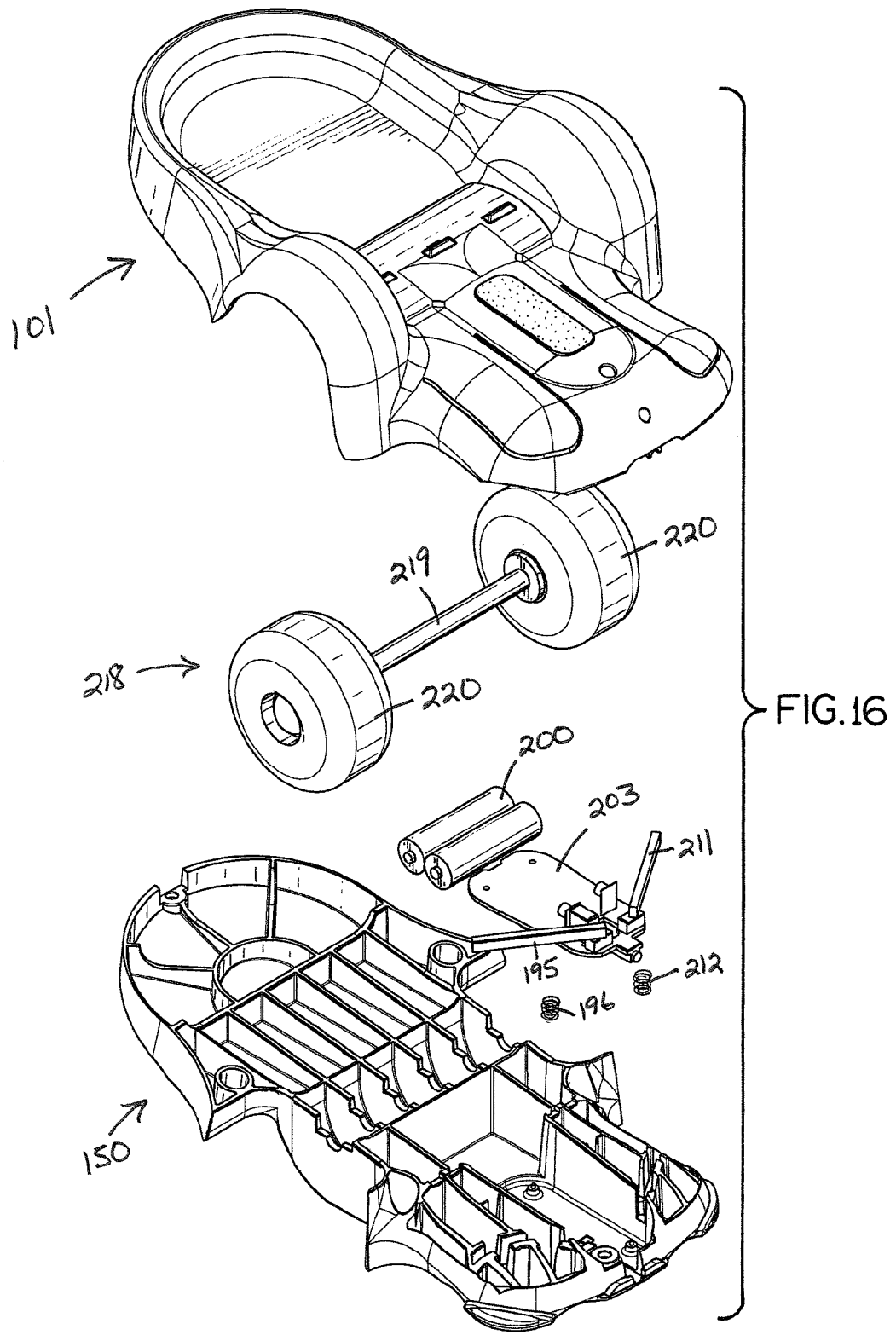
FIG. 16 is an exploded top perspective view of the foot operated mouse shown in FIG. 1.
Figure 17:
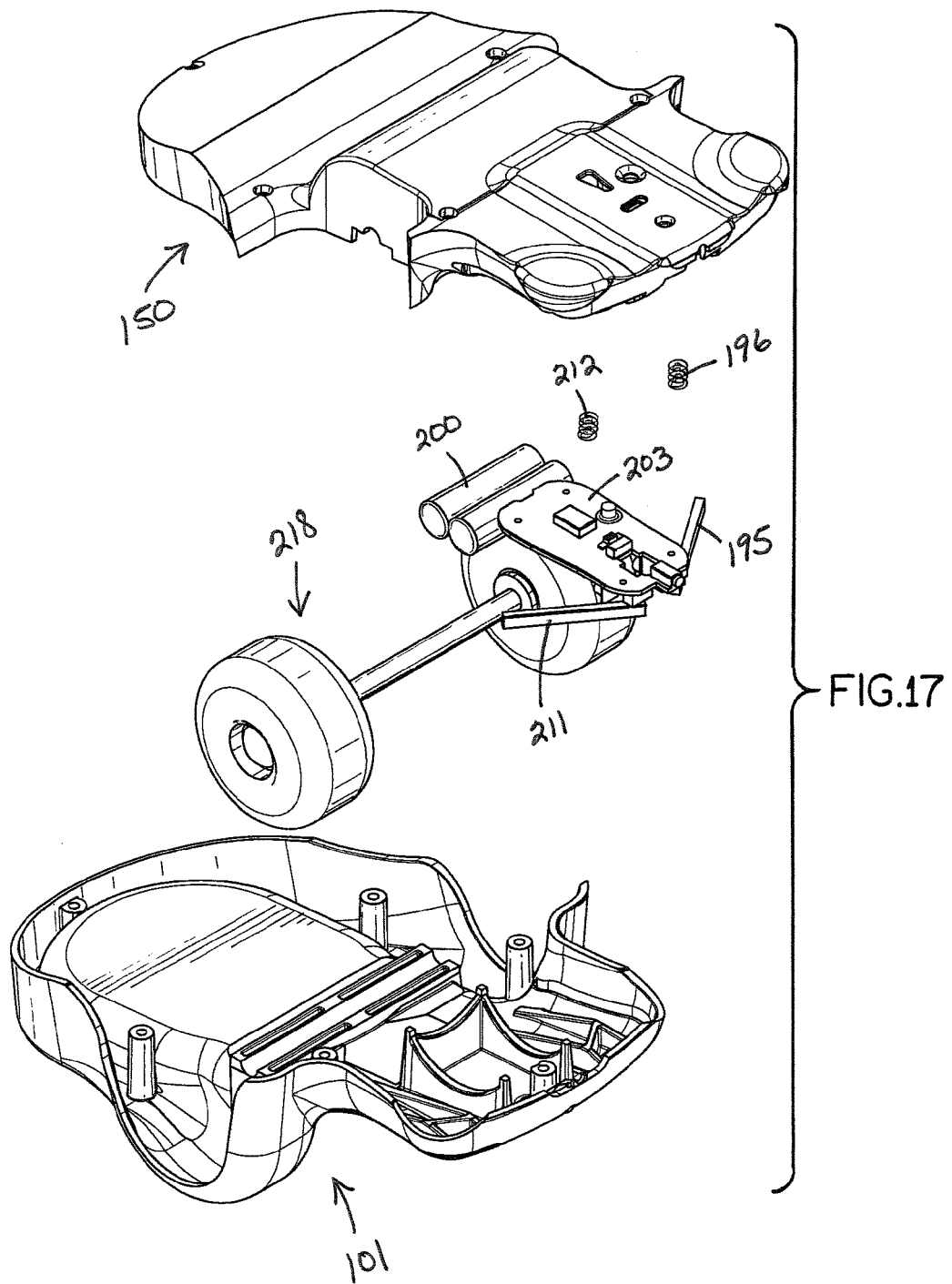
FIG. 17 is an exploded bottom perspective view of the foot operated mouse shown in FIG. 1.
Figure 18:
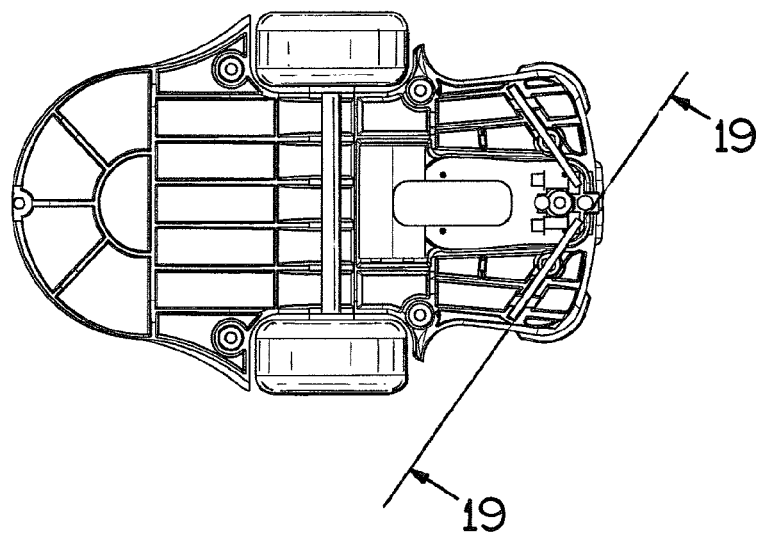
FIG. 18 is a top view of the base including the controller, batteries, and the wheel mechanism shown in FIG. 9.
Figure 19:
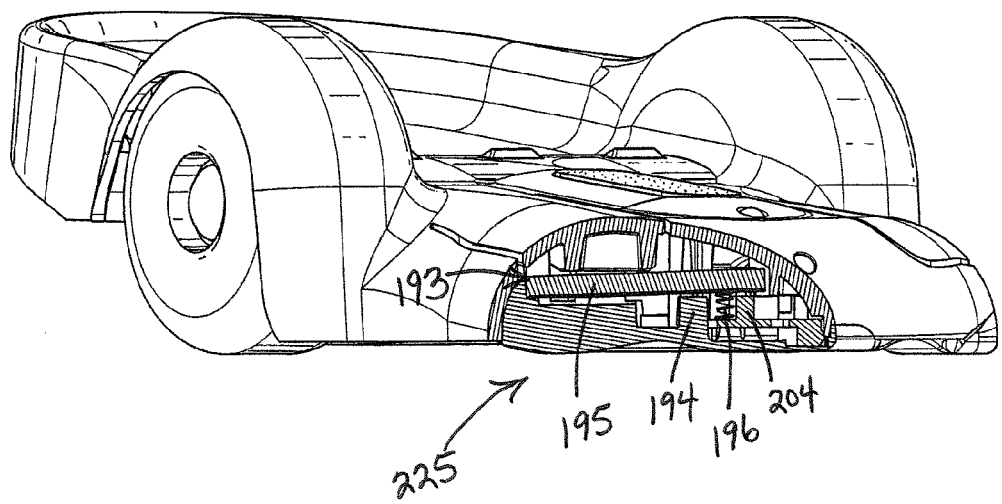
FIG. 19 is a cross-section view of the base generally taken along the line 19-19 in FIG. 18.
Figure 20:
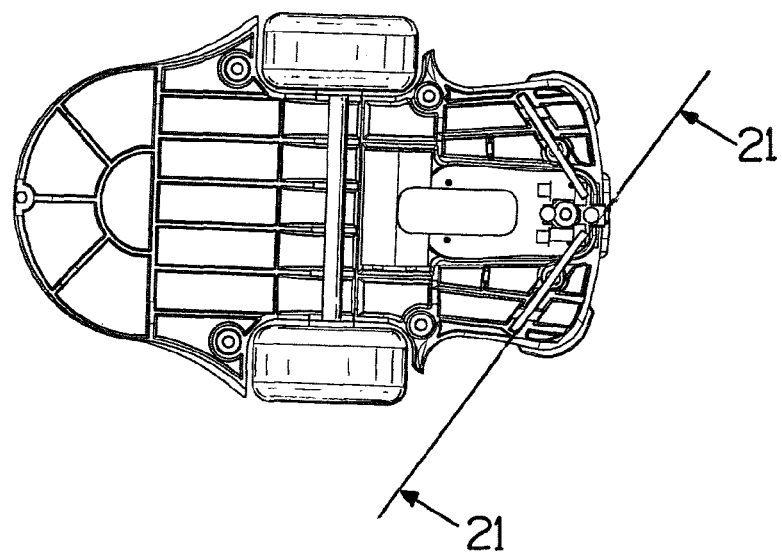
FIG. 20 is a top view of the base including the controller, batteries, and the wheel mechanism shown in FIG. 9.
Figure 21:
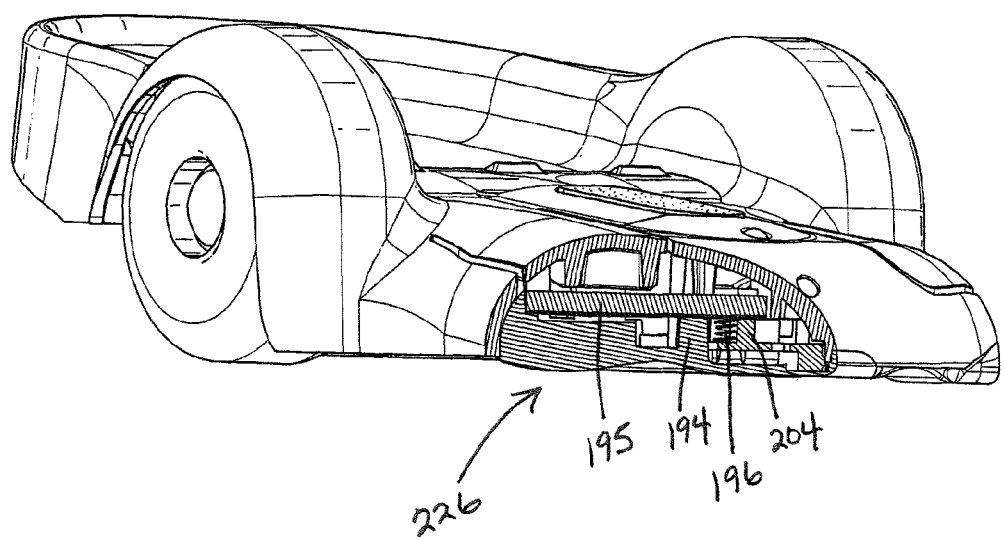
FIG. 21 is a cross-section view of the base generally taken along the line 21-21 in FIG. 20.

The cover 101 includes an outer surface 102, which is shown in at least FIGS. 1 and 3-5, and an inner surface 126, which is shown in at least FIGS. 14 and 15. The outer surface 102 includes a support surface 104 configured and arranged to support a user's foot. The support surface includes a heel portion 106, an intermediate portion 109, and a toe portion 114. A wall portion 107 extends upward from the heel portion 106 and merges with a fender 110 extending upward from the intermediate portion 109. The wall portion 107 and the fender 110 assist the user in positioning the user's foot on the mouse and are configured and arranged to prevent the user's foot from sliding off the rear and the sides of the mouse, although the user's foot may or may not contact the wall portion 107 or the fender 110 during use. The intermediate portion 109 also includes a lateral raised surface 111, which also assists the user in positioning the user's foot on the mouse and provides some arch support for the user's instep. Optional protrusions 112 extending upward from the lateral raised surface 111 provide a non-slip surface to assist in maintaining proper position of the user's foot on the mouse. The toe portion 114 includes a longitudinal raised surface 115 extending outward from the lateral raised surface 111 proximate the middle of the toe portion 114, and the longitudinal raised surface 115 includes an optional traction pad 116, which also provides a non-slip surface. An indicator light 117 is positioned proximate the front end of the longitudinal raised surface 115 and an indicator light 118 is positioned proximate the front of the toe portion 114. The indicator lights 117 and 118 could be positioned in any desired location on the mouse 100 and the indicator lights 117 and 118 could be used to indicate pairing with a BLUETOOTH™ device, power, low battery, charging indicator, or any other desired indicators. In this embodiment, the indicator light 117 indicates power and charging status, and the indicator light 118 indicates BLUETOOTH™ pairing. Proximate the right side of the toe portion 114 is a right cut line 121 with ends 121a and 121b, which forms a right button 122, and proximate the left side of the toe portion 114 is a left cut line 123 with ends 123a and 123b, which forms a left button 124. The right and left cut lines 121 and 123 are generally U-shaped so that the right and left buttons 122 and 124 generally deflect proximate hinge areas defined by the ends, 121a and 121b for right button 122 and 123a and 123b for left button 124. Each button 122 and 124 operates independently of the other.

The inner surface 126 includes a heel portion 127, an intermediate portion 131, and a toe portion 135. Proximate the rear of the heel portion 127 is a cylinder 128 with a bore 128a, and proximate the sides of the heel portion 127 are cylinders 129 with bores 129a. As shown in at least FIG. 14, the wall portion 107 is generally U-shaped and the cylinders 128 and 129 are positioned between the heel portion 127 and the downward extending portion of the wall portion 107. The intermediate portion 131 is positioned between the fenders 110 and includes an axle receiving portion 132 with a lateral channel 133 extending therethrough. Proximate the sides of the toe portion 135 are cylinders 136 with bores 136a, and proximate the front of the toe portion 135 is a cylinder 137 with a bore 137a. The inner surface of the right button 122 includes right button ribs 139 with an actuator contact portion 140, and the inner surface of the left button 124 includes left button ribs 145 with an actuator contact portion 146. Between the right and left buttons 122 and 124 is a U-shaped rib 142 forming a cavity 143. The front edge of the toe portion 135 includes a bracket 148 with a semi-circular notch.

Figure 2:
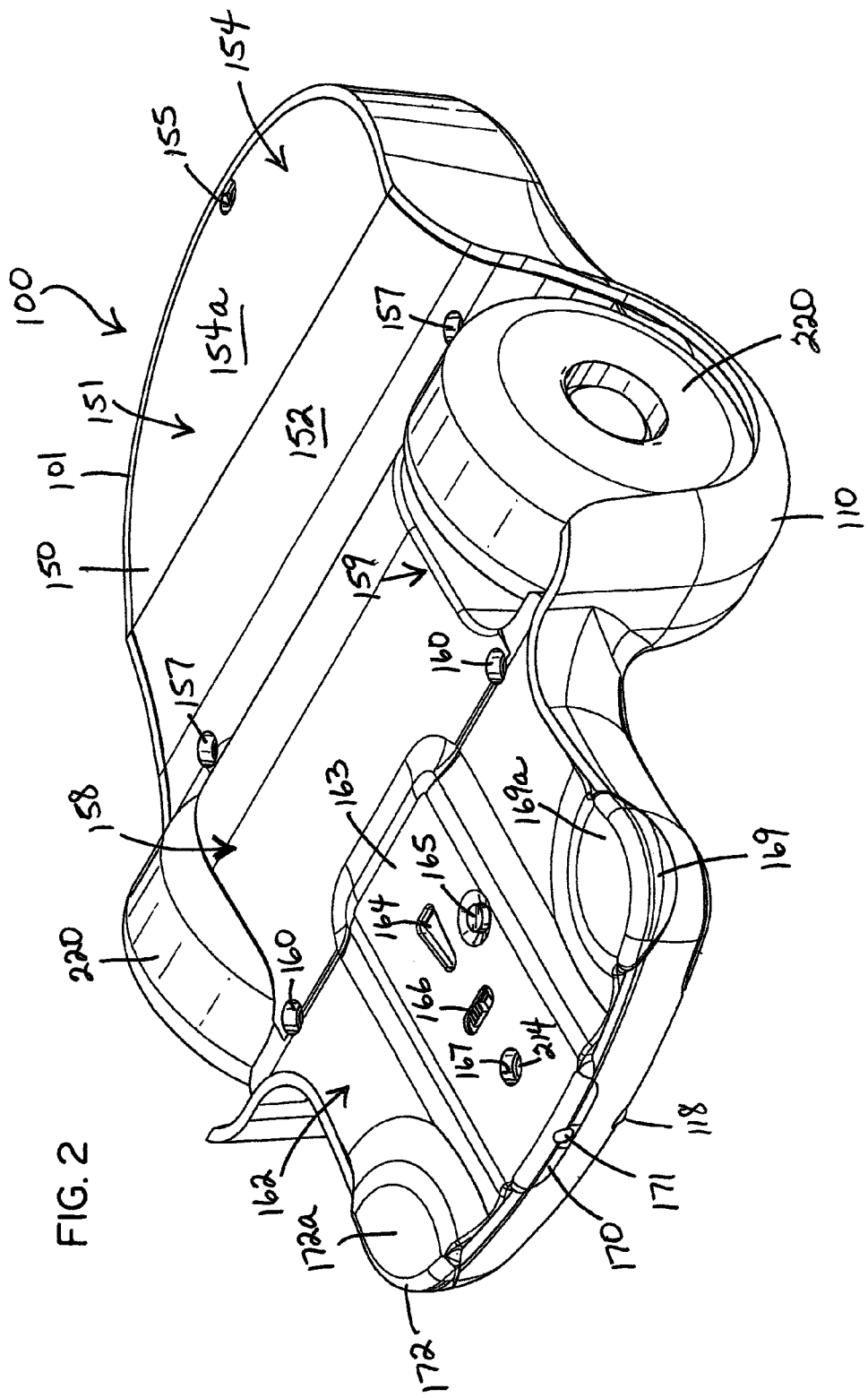
FIG. 2 is a bottom perspective view of the foot operated mouse shown in FIG. 1.
Figure 3:
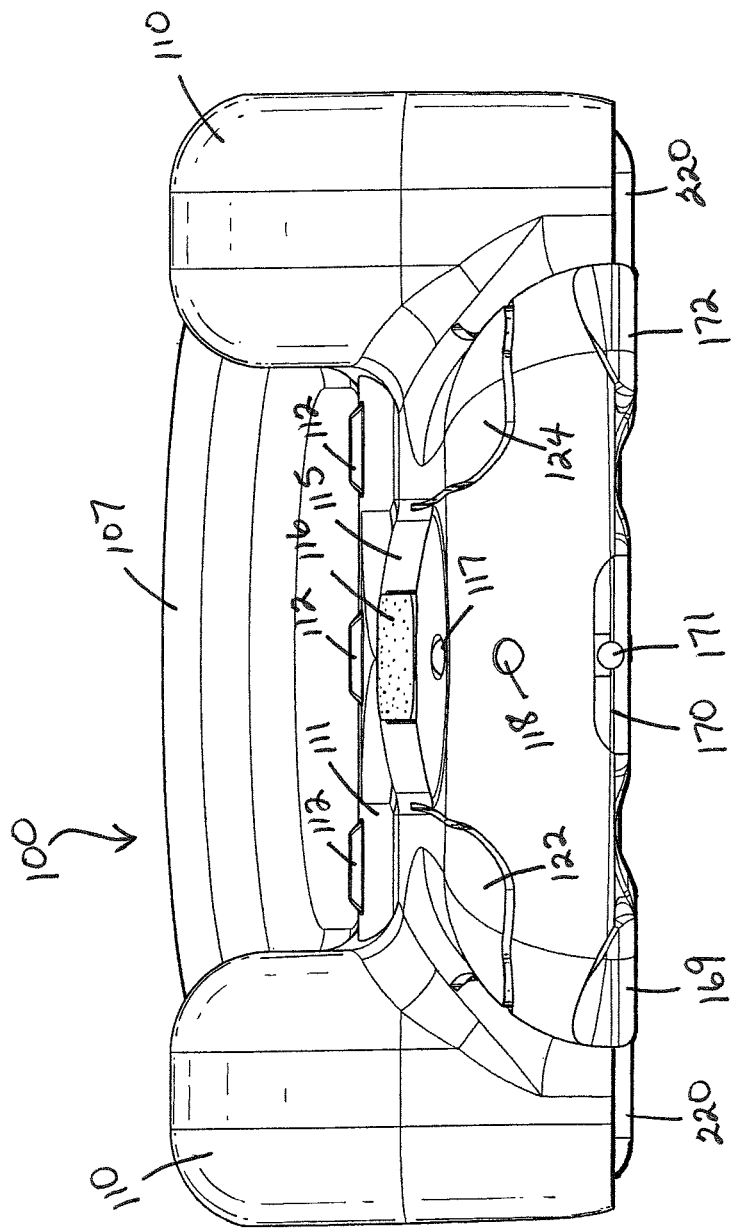
FIG. 3 is a front view of the foot operated mouse shown in FIG. 1.
Figure 4:
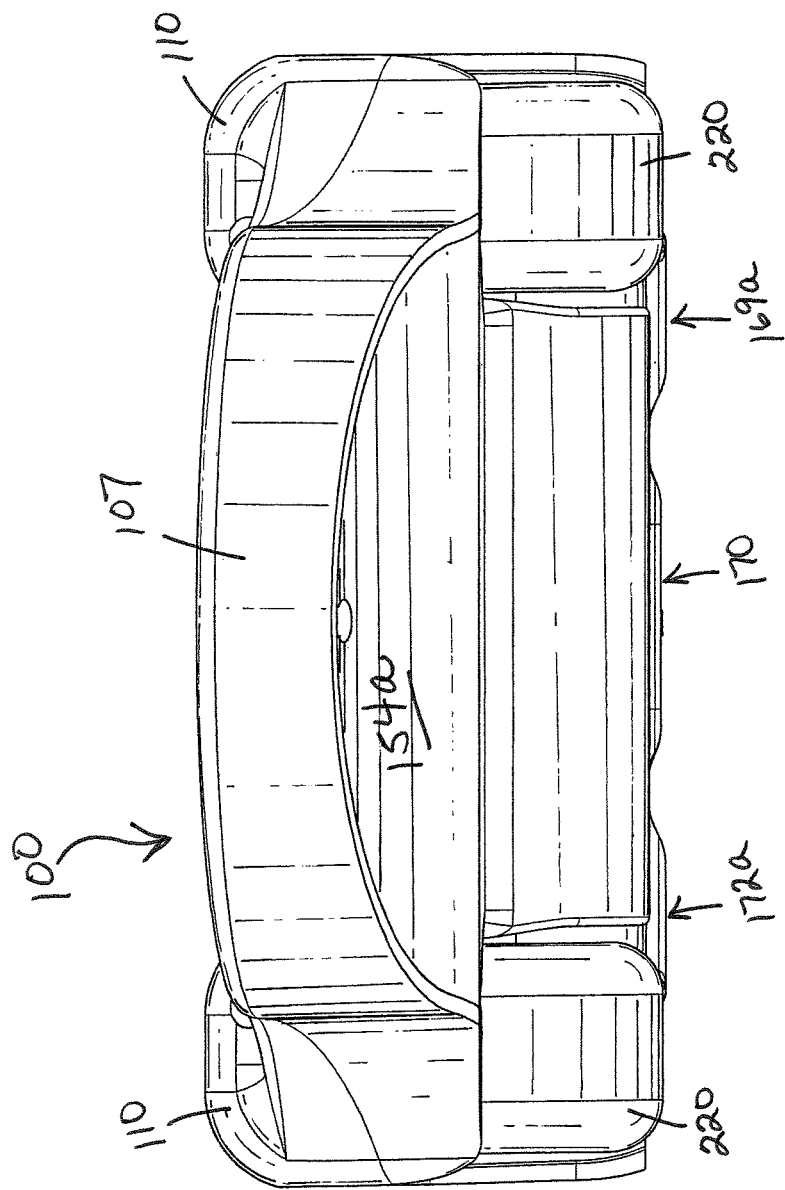
FIG. 4 is a rear view of the foot operated mouse shown in FIG. 1.
Figure 5:
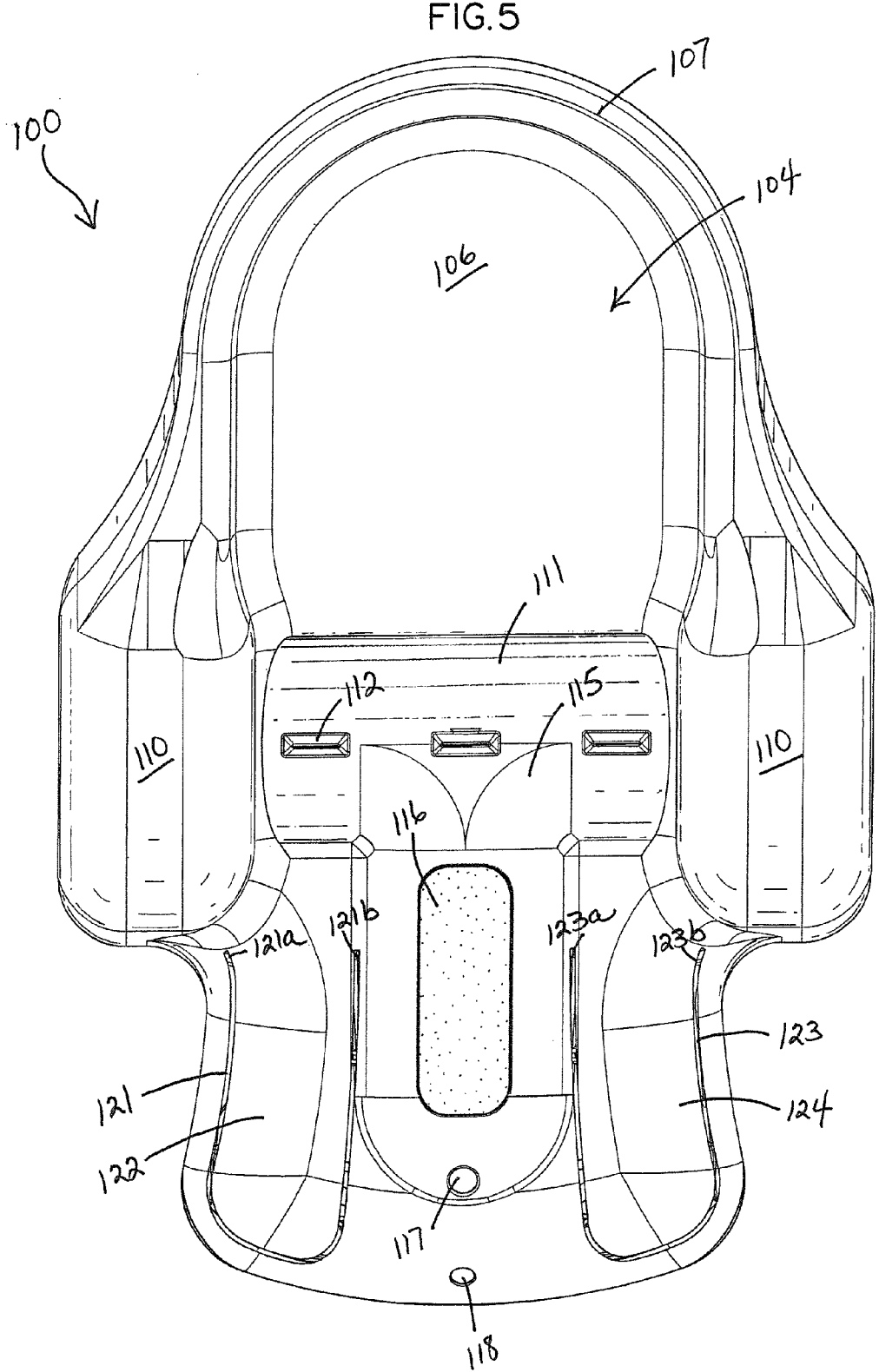
FIG. 5 is a top view of the foot operated mouse shown in FIG. 1.
Figure 6:
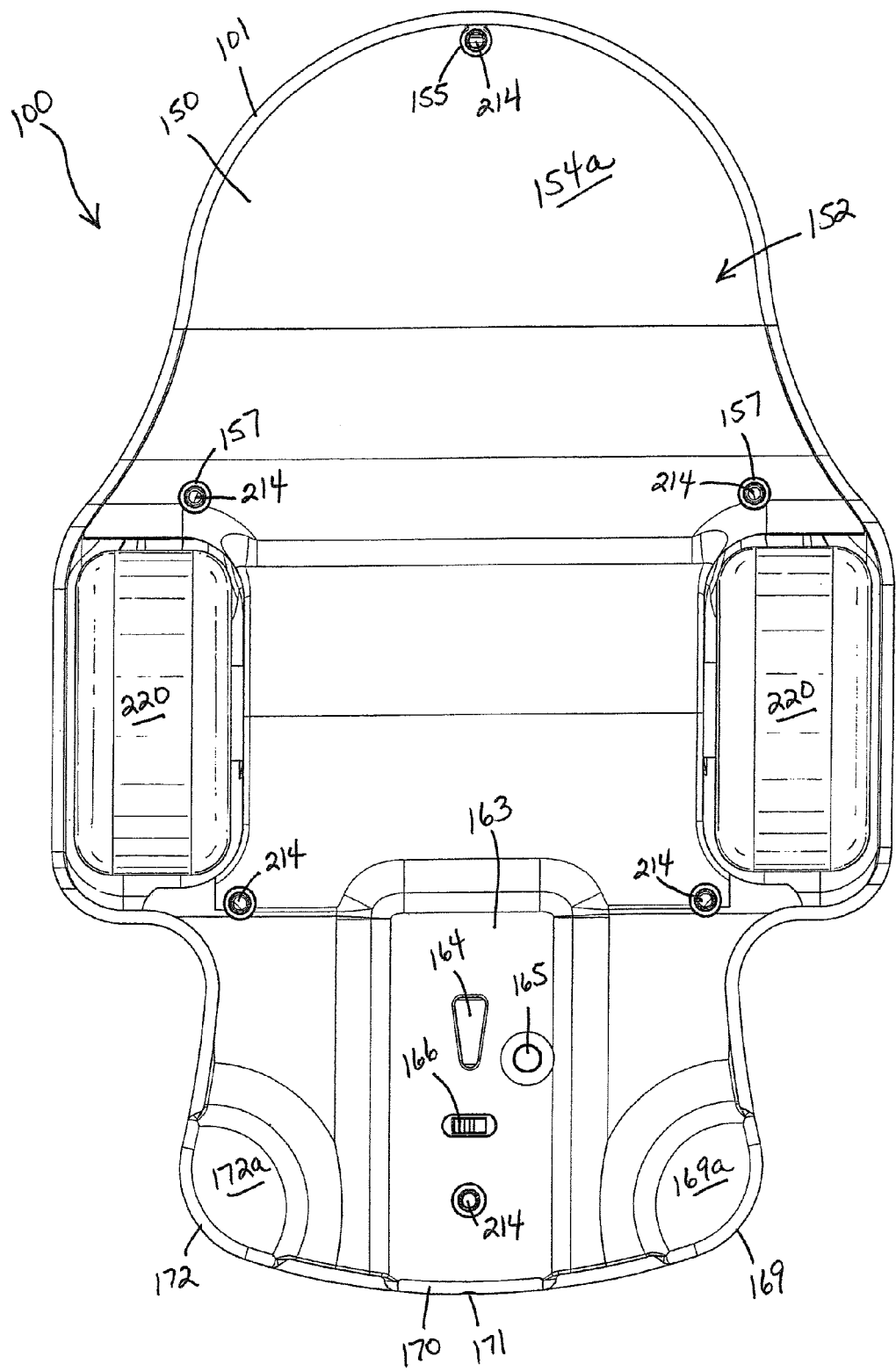
FIG. 6 is a bottom view of the foot operated mouse shown in FIG. 1.
Figure 7:
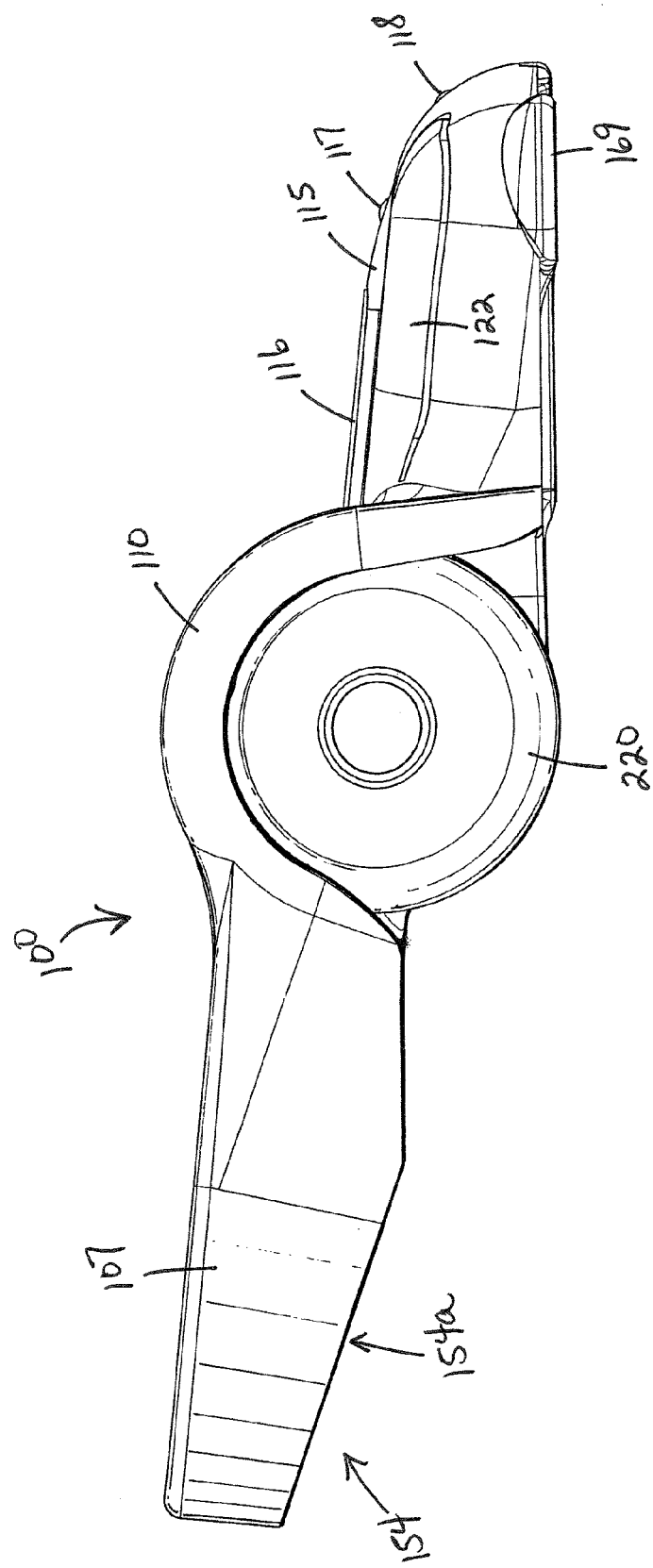
FIG. 7 is a right side view of the foot operated mouse shown in FIG. 1.
Figure 8:
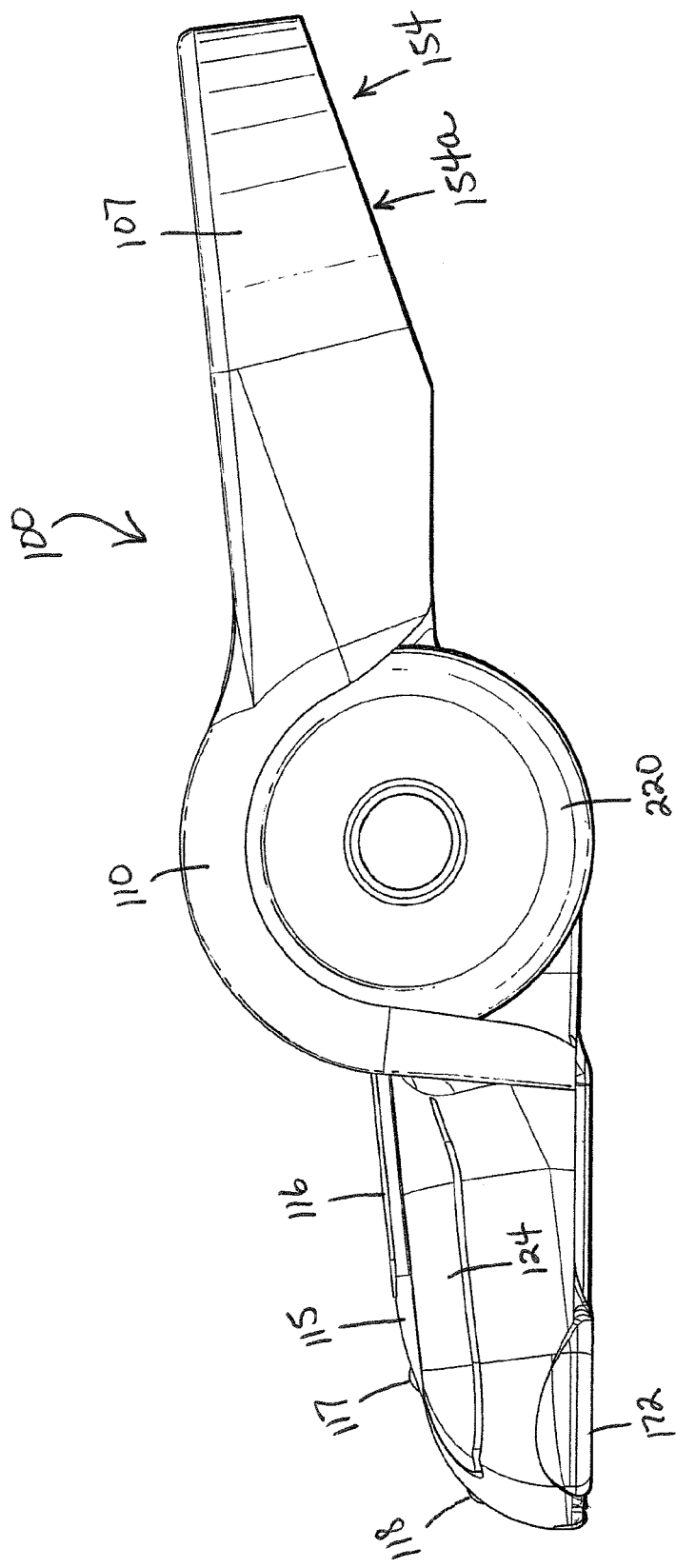
FIG. 8 is a left side view of the foot operated mouse shown in FIG. 1.
Figure 9:
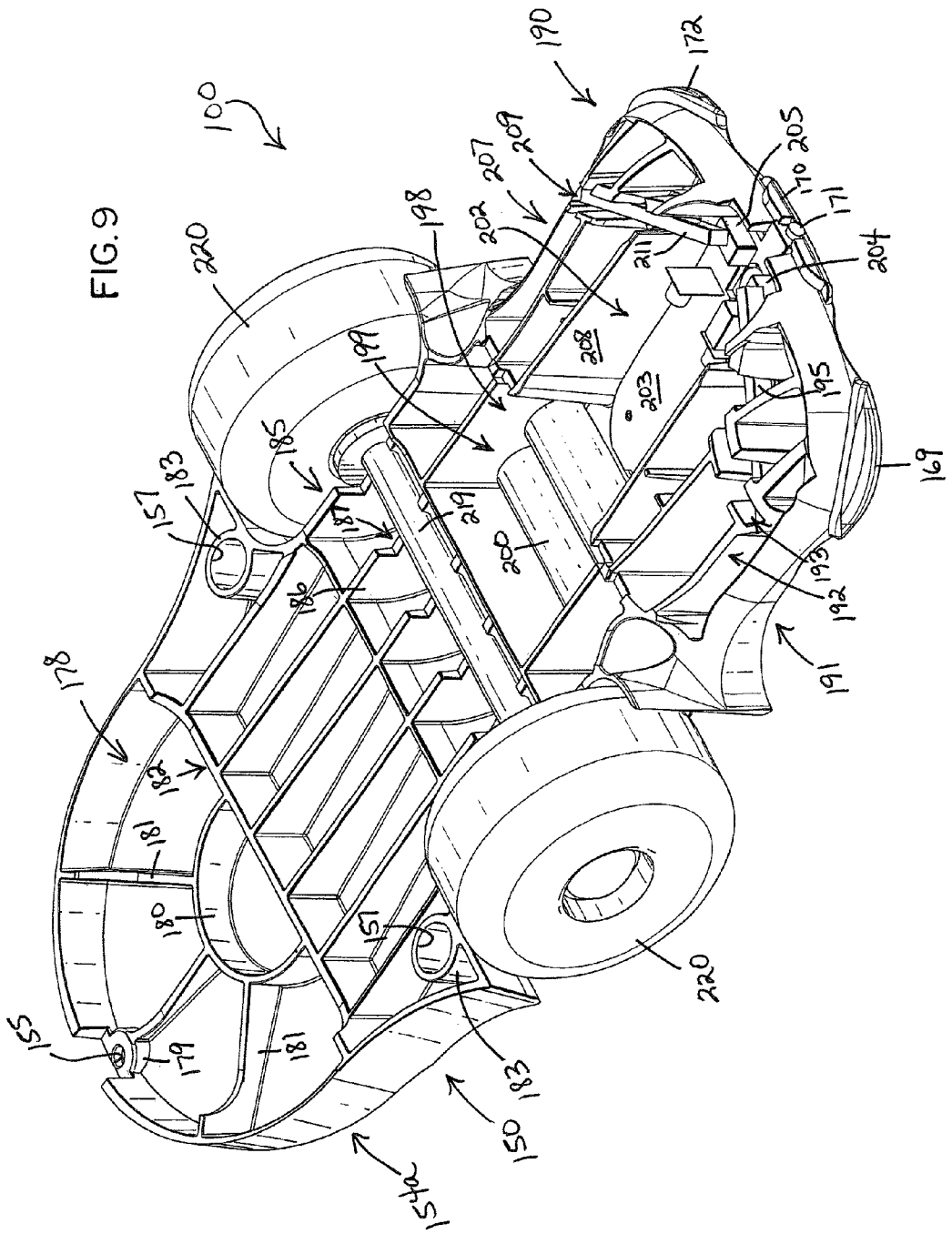
FIG. 9 is a top perspective view of a base including a controller, batteries, and a wheel mechanism of the foot operated mouse shown in FIG. 1.
Figure 10:
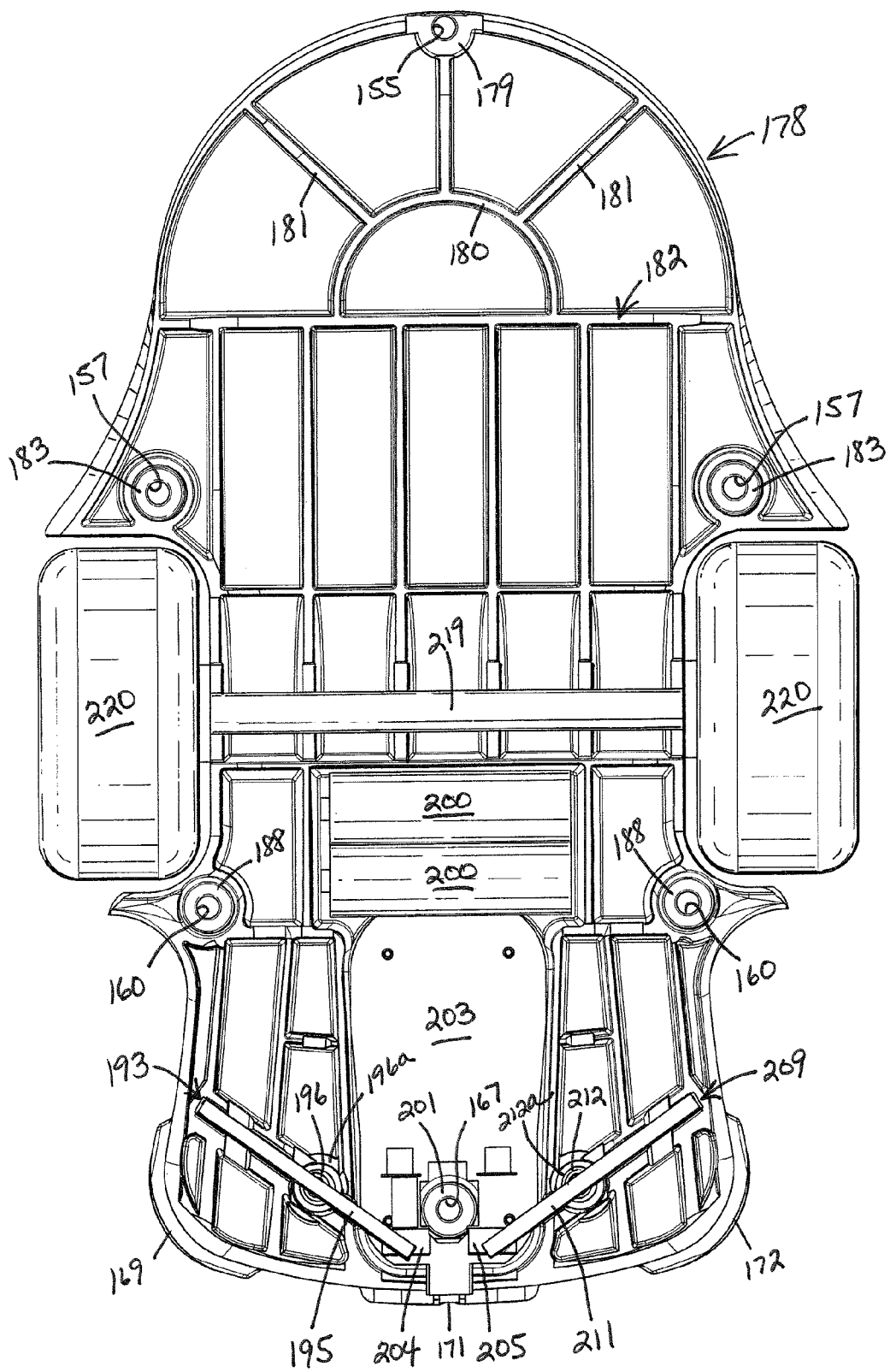
FIG. 10 is a top view of the base including the controller, batteries, and the wheel mechanism shown in FIG. 9.
Figure 11:
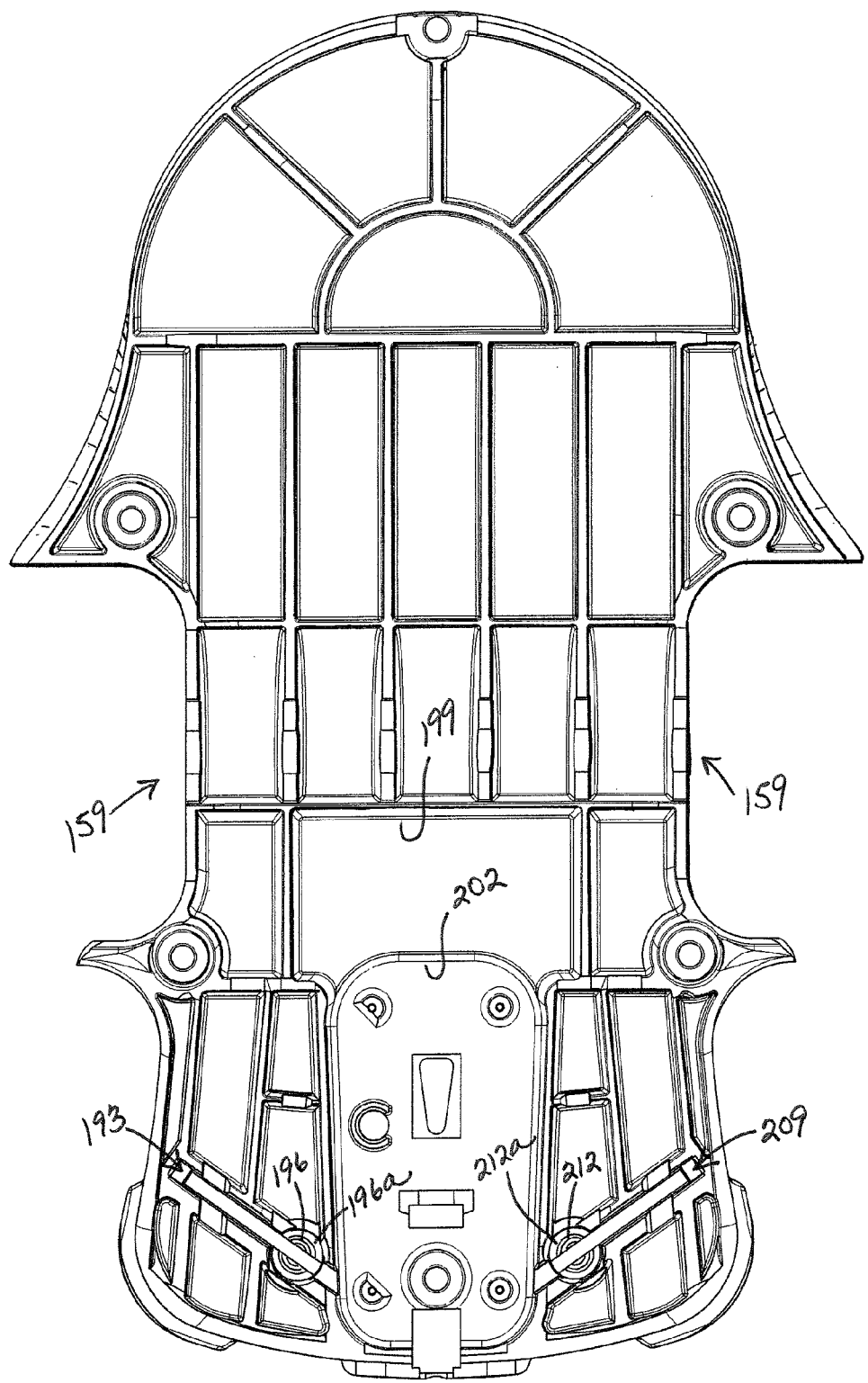
FIG. 11 is a top view of the base excluding the controller, batteries, and the wheel mechanism shown in FIG. 9.
Figure 12:
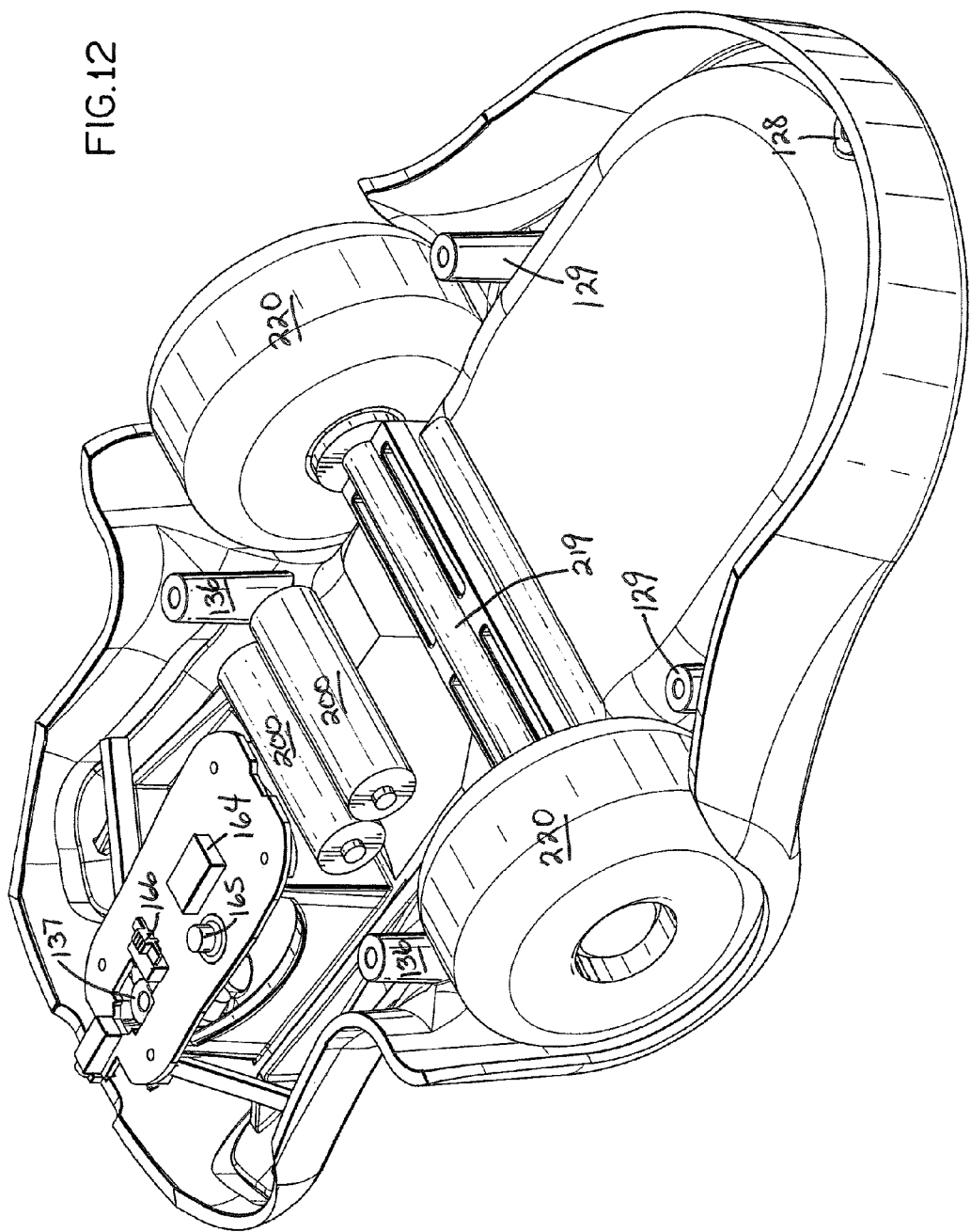
FIG. 12 is a bottom perspective view of a cover including the controller, batteries, and the wheel mechanism of the foot operated mouse shown in FIG. 1.
Figure 13:
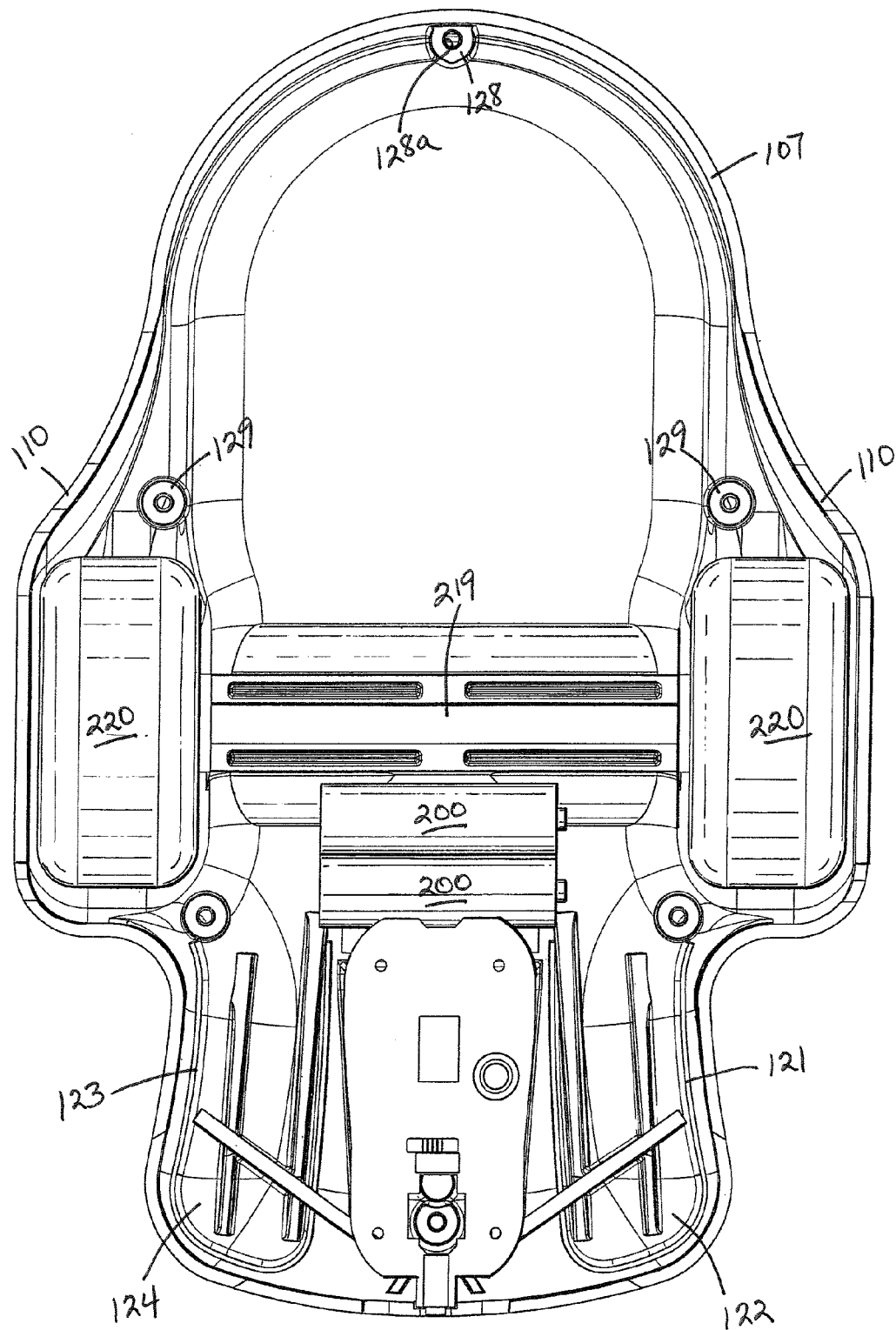
FIG. 13 is a bottom view of the cover including the controller, batteries, and the wheel mechanism shown in FIG. 12.

The base 150 includes an outer surface 151, which is shown in at least FIGS. 2 and 6, and an inner surface 176, which is shown in at least FIGS. 9-11. The outer surface 151 includes a plate portion 152, which includes a heel portion 154, an intermediate portion 158, and a toe portion 162. As shown in FIGS. 7, 8, 23, and 24, the plate portion 152 is not flat. When the toe portion 162 is contacting the floor or operating surface, the heel portion 154 is elevated relative to the floor or operating surface and the intermediate portion 158 is generally curved to interconnect these portions. The heel portion 154 includes a contact surface 154a configured and arranged to contact the floor or operating surface when the heel portion 154 is pivoted downward and the toe portion 162 is elevated relative to the floor or operating surface. A bore 155 is positioned proximate the rear of the heel portion 154 and bores 157 are positioned proximate the sides of the heel portion 154. The intermediate portion 158 includes notches or wheel cutouts 159. The toe portion 162 includes bores 160 proximate its sides and the intermediate portion 158. Proximate the middle of the toe portion 162, a longitudinal raised surface 163 extends from proximate the intermediate portion 158 to proximate the front of the toe portion 162. The longitudinal raised surface 163 includes apertures for a laser optical sensor 164, a pairing or reset button 165, and a power switch 166. The front portion of the longitudinal raised surface 163 includes a bore 167. The toe portion 162 also includes a bumper 169 and a contact surface 169a proximate its right corner, a bumper 170 proximate its middle front surface, and a bumper 172 and a contact surface 172a proximate its left corner.

The inner surface 176 includes a heel portion 178, an intermediate portion 185, and a toe portion 190. A cylinder 179 through which the bore 155 extends is positioned proximate the rear of the heel portion 178. Proximate the contact surface portion of the heel portion are a semi-circular rib 180 and radially extending ribs 181. Between the contact surface portion and the intermediate portion 185 are rectangular ribs 182, and proximate the sides of the heel portion and the intermediate portion 185 are cylinders 183 through which bores 157 extend. The intermediate portion 185 includes ribs 186 with notches that form an axle receiving portion 187. The toe portion 190 includes generally rectangular ribs 192 proximate its right side 191 with intersecting ribs that form a slot 193 configured and arranged to receive an actuator 195. A biasing member 196 is positioned between the base 150 and the actuator 195 with a bottom portion of the biasing member 196 positioned within a biasing member receiving portion

196a, which is a cylindrical seat portion operatively connected to the base 150 and configured and arranged to receive the bottom portion of the biasing member 196. A stop member 194 extends upward from the base 150 proximate the biasing member 196. The toe portion 190 also includes generally rectangular ribs 208 proximate its left side 207 with intersecting ribs that form a slot 209 configured and arranged to receive an actuator 211. A biasing member 212 is positioned between the base 150 and the actuator 211 with a bottom portion of the biasing member 212 positioned within a biasing member receiving portion 212a, which is a cylindrical seat portion operatively connected to the base 150 and configured and arranged to receive the bottom portion of the biasing member 212. A stop member (not shown) extends upward from the base 150 proximate the biasing member 212. A cavity 198 is positioned between the right and left ribs 192 and 208 and includes a battery receiving portion 199 configured and arranged to receive batteries 200 and a controller receiving portion 202 configured and arranged to receive a controller 203. Although any suitable battery or batteries could be used, an example of a suitable batter is a 3 volt battery pack. Although any suitable controller could be used, an example of a suitable controller is that used in Model BT500 Bluetooth Wireless Mouse manufactured by RadTech. The controller 203 includes a right button 204 proximate the actuator 195, a left button 205 proximate the actuator 211, the laser optical sensor 164, the pairing or reset button 165, the power switch 166, and a charging port 171. The batteries 200 and the controller 203 are interconnected with wires (not shown). One wire interconnects one battery to the right button 204 and the other wire interconnects the other battery to the left button 205. The charging port 171 is positioned between the bumper 170 and the bracket 148. Preferably, the stop members are positioned between the respective biasing members 196 and 212 and controller buttons. A cylinder 201 with bore 167 is positioned proximate the front of the toe portion 190 within the controller receiving portion 202 proximate between the actuators 195 and 211.

Although the pivot member 218 is shown as a pair of wheels 220 operatively connected to an axle 219, which is operatively connected to the cover 101 and the base 150, it is recognized that the pivot member could be any suitable device enabling the mouse to pivot in a similar manner. The pivot member could be a separate element or it could be integral with at least one of the cover and the base. The pivot member 218 allows the mouse 100 to pivot between an operating position 222 and a nonoperating position (not shown). The operating position 222 is when the toe portion and the sensor mechanism are proximate the floor or operating surface, and the nonoperating position is when the toe portion and the sensor mechanism are positioned upward away from the floor or operating surface. Moving between the operating position 222 and the nonoperating position is accomplished by simply pivoting the housing proximate the pivot member 218 to raise and lower the toe portion and the heel portion relative to the floor or operating surface. Thus, the housing rocks forward and backward about the pivot member 218.

To assemble the mouse 100, the controller 203 is positioned in the base's controller receiving portion 202 with the charging port 171 extending through a gap in the middle bumper 170 and the batteries 200 are positioned in the base's battery receiving portion 199 as is well known in the art. The bottom portions of biasing members 196 and 212 are positioned within the respective biasing member receiving portions 196a and 212a and the actuators 195 and 211 are positioned in the respective slots 193 and 209 to position the biasing members 196 and 212 between the base 150 and the actuators 195 and 211. The axle 219 is positioned in the axle receiving portion 187 so that the wheels 220 are positioned proximate the sides of the base's intermediate portion 185.

The cover 101 is then positioned over the base 150 so that the controller 203 is positioned proximate the cover's rib 142, the charging port 171 extends through the notch in the bracket 148, which mates with the middle bumper 170, the actuator contact portions 140 and 146 contact the actuators 195 and 211, and the axle 219 is positioned within the channel 133 so that the wheels 220 are positioned within the fenders 110. In addition, the bore 128a aligns with the bore 155, the bores 129a align with the bores 157, the bores 136a align with the bores 160, and the bore 137a aligns with the bore 167. Fasteners 214 such as screws are inserted through the aligning bores and threadably engage the cover's cylinders to connect the cover 101 and the base 150.

The housing is preferably made of a lightweight material such as plastic and preferably includes a plurality of ribs or rib members to assist in strengthening the housing. The housing is also configured and arranged to handle someone stepping on it with all of his or her weight by allowing the base portion to deflect and contact the floor or operating surface. This prevents all of the load from going through the axle, which could possibly break the housing, and this prevents accidental movement of the mouse due to friction between the base portion and the floor or operating surface.

The mouse 100 is easily paired with a computer via a BLUETOOTH™ device in accordance with methods well known in the art. The mouse functions including button configurations, speed, appearance, and other functions can be changed in accordance with methods well known in the art. Although any desired configuration can be set up by the user, conventional configurations will be described herein without limiting the present invention to such conventional configurations.

To charge the mouse 100, the charger cord (not shown) is plugged into any available USB port of a computer and the other end of the charger cord is plugged into the charging port 171. The charge time will depend upon the remaining charge in the battery, the age of the battery, the ambient temperature, and other factors. Preferably, when the power switch is in the on position, the mouse will power off after one hour of no use and movement of the mouse 100 will turn it back on.

In operation, after the mouse 100 has been sufficiently charged and linked to the user's computer, the user ensures the power switch 166 is in the on position and then places the mouse 100 on the floor or operating surface, which could be any suitable surface upon which the mouse could be operated with the user's foot. Once turned on, the mouse 100 should automatically pair with the user's computer. The user position's the user's foot 300 on the outer surface 102 of the cover 101 with the user's heel 301 proximate the heel portion 106, the user's instep 302 proximate the lateral raised surface 111, and the user's toes 303 proximate the toe portion 135. The ball 304 of the user's foot generally rests upon the longitudinal raised surface 115.

The user may use either foot to operate the mouse 100. The user can rest the entire weight of the user's leg and foot on the mouse 100, but the user should not stand on the mouse 100. The ball 304 of the user's foot is positioned generally on the longitudinal raised surface 115 proximate the right and left buttons 122 and 124. It is recommended that the user's leg be positioned vertical to the floor or operating surface. If movement of the mouse 100 is too easy, pressure on the toe portion of the mouse can be increased to increase friction between the contact surfaces 169a and 172a and the floor or operating surface.

To move the cursor, the user simply moves the mouse with the user's foot in a manner similar to how a hand operated mouse is moved. The toe portion of the mouse should be positioned close enough to the floor to engage the laser optical sensor. To move the mouse without moving the cursor, the user pivots the toe portion of the mouse upward relative to the pivot member, which disengages the laser optical sensor, and then moves the mouse to the desired location. To move the cursor again, the user pivots the toe portion of the mouse downward relative to the pivot member to engage the laser optical sensor. To activate the left mouse click, the user depresses the left button with the user's foot similar to a left mouse click with a hand operated mouse. To activate a right mouse click, the user depresses the right button with the user's foot similar to a right mouse click with a hand operated mouse. To depress either button, it may be easier for the user to move the user's knee sideways in the desired direction to assist in moving the user's foot on the longitudinal raised surface 115 toward the side where the desired button is located. Thus, the user does not need to pick the user's foot up off the mouse to depress either button. The user only needs to move or rock the user's foot toward the side of the desired button. In addition, the user may also rotate the user's ankle to move the mouse to a desired location. Preferably, the user's foot maintains contact with the longitudinal raised surface 115 and the user rolls his or her foot over the longitudinal raised surface 115 toward the desired button.

The pivot member 218 allows the mouse 100 to be pivoted upward to inactivate the cursor by disengaging the laser optical sensor and downward to activate the cursor by engaging the laser optical sensor. The laser optical sensor is engaged when it is proximate the floor or operating surface, and the laser optical sensor is disengaged when it is moved a distance away from the floor or operating surface. Preferably, the laser optical sensor detects the floor or operating surface when it is approximately less than 3 centimeters away from the floor or operating surface. Although wheels are shown as the pivot member, it is recognized that any suitable pivot member could be used. For example, the pivot member could be a cylindrical or rounded member allowing the mouse to pivot the toe portion upward and downward relative to the floor. Because the user uses muscles including his or her quadriceps to move the mouse and the quadriceps are large muscles, it could be difficult to move and control the mouse. Although any suitable pivot member could be used, it is preferred that the pivot member includes wheels to assist in moving the mouse with less friction between the mouse and the floor or operating surface. Not only do the wheels 220 allow the housing to be pivoted but the wheels 220 also allow the housing to be easily moved by the user. Although two wheels are shown, any suitable number of wheel(s) could be used.

The biasing members 196 and 212 are positioned between the base 150 and the respective actuators 195 and 211 to exert an upward force on the actuators 195 and 211 so that the actuators 195 and 211 do not contact the respective buttons 204 and 205 of the controller 203 when in upward positions 225. The stop members extend upward from the base 150 but do not contact the actuators 195 and 211 when the actuators 195 and 211 are in upward positions 225. When downward force is exerted on the actuators 195 and 211 by pressing the respective buttons 122 and 124, the biasing members 196 and 212 are compressed, the actuators 195 and 211 move downward to press the respective buttons 204 and 205 of the controller 203, and the stop members prevent the actuators 195 and 211 from moving downward too far and exerting excessive force on the buttons 204 and 205 of the controller 203 in downward positions 226. Although operation of both right and left buttons has been described together, it is recognized that each button can be operated independently of the other and that each assembly can independently be in an upward position 225 or a downward position 226.

The standard electrical buttons 204 and 205 of the controller 203 generally cannot take a lot of weight. Therefore, the actuators 195 and 211 and the stop members assist in preventing too much force or load from being applied to the buttons 204 and 205. When either the right button 122 or the left button 124 is pressed, the actuator contact portion of the button contacts the respective actuator, the biasing member is compressed, and the actuator contacts the controller button. The stop member prevents the actuator from pressing to hard on the controller button.

Benefits include, but are not limited to, hands free operation similar to a hand operated mouse so there is a reduced learning curve, no desktop space is required, wheels allow easy movement of the mouse, ankle rotation provides excellent small motor control, pivoting to inactivate the cursor allows movement of the mouse without having to lift the entire mouse, and weight bearing capability allows relaxation of the leg during use. In addition, the sensors are located in front of the wheels, the indicator lights are located on top for ease of use, and the controller and the batteries are positioned in a cavity to reduce the chance of contaminants, including moisture, from entering the cavity and affecting the operation of the controller.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. A foot operated mouse for use on a surface, comprising: a housing including a heel portion, a toe portion, a wheel mechanism, and a sensor mechanism proximate the toe portion, the wheel mechanism configured and arranged to contact the surface and allow the housing to pivot between an operating position and a nonoperating position, the wheel mechanism contacting the surface in the operating position and in the nonoperating position, the wheel mechanism rotatably operatively connected to the housing to facilitate movement of the housing relative to the surface, the operating position being when the toe portion and the sensor mechanism are proximate the surface, and the nonoperating position being when the toe portion and the sensor mechanism are pivoted upward away from the surface, the housing being in the operating position when there is one of no load placed on the housing and a first load placed on the housing that is greater proximate the toe portion until a second load is placed on the housing that is greater proximate the heel portion to pivot the housing into the nonoperating position in which the toe portion is positioned upward away from the surface.

2. The foot operated mouse of claim 1, further comprising an intermediate portion interconnecting the heel portion and the toe portion, the intermediate portion including the wheel mechanism.

3. The foot operated mouse of claim 1, wherein the wheel mechanism is a pair of wheels, a wheel positioned proximate each side of a user's foot during use when the user's foot is positioned on the housing.

4. The foot operated mouse of claim 1, further comprising a longitudinal raised surface positioned between a right button and a left button proximate the toe portion.

5. The foot operated mouse of claim 4, further comprising a traction pad operatively connected to the longitudinal raised surface.

6. The foot operated mouse of claim 1, further comprising a lateral raised surface positioned proximate the intermediate portion.

7. The foot operated mouse of claim 6, further comprising at least one protrusion extending outward from the lateral raised surface.

8. The foot operated mouse of claim 1, wherein the sensor mechanism is a laser optical sensor and the operating position is when the laser optical sensor is approximately less than 3 centimeters from the surface.

9. A foot operated mouse for use on a surface, comprising:
a housing including a heel portion, a toe portion, a pivot member, and a sensor mechanism, the pivot member configured and arranged to contact the surface and allow the housing to pivot between an operating position and a nonoperating position, the operating position being when the sensor mechanism is proximate the surface, and the nonoperating position being when the sensor mechanism is pivoted upward away from the surface; and
an actuator interconnecting a housing button and a controller button, the actuator being spring biased in an upward position, the housing including a stop member configured and arranged to prevent the actuator from being moved downward beyond the stop member thereby preventing excessive force from being applied to the controller button.

10. The foot operated mouse of claim 9, wherein the controller button and an associated controller are positioned in a cavity surrounded by ribs protecting the controller button and the associated controller from contaminants.

11. A foot operated mouse for use on a surface, comprising:
a housing including an intermediate portion interconnecting a heel portion and a toe portion, the toe portion including a sensor mechanism; and
a wheel mechanism operatively connected to the housing proximate the intermediate portion, the wheel mechanism rotating relative to the housing to facilitate movement of the housing relative to the surface, the wheel mechanism being configured and arranged to contact the surface and allow the housing to pivot between an operating position and a nonoperating position, the operating position being when the toe portion and the sensor mechanism are proximate the surface, and the nonoperating position being when the toe portion is pivoted upward away from the surface, the housing being in the operating position when there is one of no load placed on the housing and a first load placed on the housing that is greater proximate the toe portion until a second load is placed on the housing that is greater proximate the heel portion to pivot the toe portion upward away from the surface.

12. The foot operated mouse of claim 11, wherein the wheel mechanism comprises an axle interconnecting a first wheel and a second wheel, the axle being operatively connected to the housing proximate the intermediate portion and the first and second wheels rotating relative to the axle and the housing.

13. The foot operated mouse of claim 11, further comprising a longitudinal raised surface positioned between a right button and a left button proximate the toe portion.

14. The foot operated mouse of claim 11, further comprising a lateral raised surface positioned proximate the intermediate portion.

15. The foot operated mouse of claim 11, further comprising an actuator interconnecting a housing button and a controller button, the actuator being spring biased in an upward position, the housing including a stop member configured and arranged to prevent the actuator from being moved downward beyond the stop member thereby preventing excessive force from being applied to the controller button.

16. A method of operating a foot operated mouse on a surface, the foot operated mouse comprising a housing and a wheel mechanism, the housing including an intermediate portion interconnecting a heel portion and a toe portion, the toe portion including a right button, a left button, and a sensor mechanism, the wheel mechanism being operatively connected to the housing proximate the intermediate portion and being configured and arranged to rotate relative to the housing, the wheel mechanism being configured and arranged to contact the surface and allow the housing to pivot between an operating position and a nonoperating position, the operating position being when the toe portion and the sensor mechanism are proximate the surface, and the nonoperating position being when the toe portion is pivoted upward away from the surface, the housing being in the operating position when there is one of no load placed on the housing and a first load placed on the housing that is greater proximate the toe portion, the housing being in the nonoperating position when there is a second load placed on the housing that is greater proximate the heel portion, comprising:
placing a user's foot having a heel, an instep, and toes on the housing positioned in the operating position with the user's heel proximate the heel portion, the user's instep proximate the intermediate portion, and the user's toes proximate the toe portion;
placing pressure on the housing with the user's foot so that the toe portion and the sensor mechanism are proximate the surface to maintain the mouse in the operating position;
moving the user's foot to press one of the right and left buttons; and
placing pressure on the heel portion with the user's foot proximate the user's heel so that the housing pivots relative to the wheel mechanism thereby moving the toe portion and the sensor mechanism upward away from the surface to position the mouse in a nonoperating position.

17. The method of claim 16, wherein the toe portion includes a longitudinal raised portion for supporting the user's foot between the right button and the left button, further comprising moving a user's knee to move the user's foot toward a desired side of the longitudinal raised portion to press a desired one of the right and left buttons.

18. The method of claim 16, wherein the intermediate portion includes a lateral raised portion for assisting the user in positioning the user's foot on the housing, further comprising placing the user's instep proximate the lateral raised portion.

19. The method of claim 16, further comprising rotating a user's ankle to move the housing to a desired location.

20. The method of claim 16, further comprising moving the housing on the surface with the wheel mechanism.

21. A foot operated mouse for use on a surface, comprising: a housing including a heel portion, a toe portion, a wheel mechanism, and a sensor mechanism, the heel portion and the toe portion configured and arranged to receive corresponding portions of a user's foot, the wheel mechanism being a pair of wheels positioned proximate each side of the user's foot during use when the user's foot is positioned on the housing, the wheel mechanism configured and arranged to contact the surface and allow the housing to pivot between an operating position and a nonoperating position, the wheel mechanism contacting the surface in the operating position and in the nonoperating position, the wheel mechanism rotatably operatively connected to the housing to facilitate movement of the housing relative to the surface, the operating position being when the sensor mechanism is proximate the surface, and the nonoperating position being when the sensor mechanism is pivoted upward away from the surface, the housing being in the operating position until a load is placed on the housing to pivot the housing into the nonoperating position.

22. The foot operated mouse of claim 21, further comprising an intermediate portion interconnecting the heel portion and the toe portion, the intermediate portion including the wheel mechanism.

23. The foot operated mouse of claim 22, wherein the wheel mechanism comprises an axle interconnecting the pair of wheels, the axle being operatively connected to the housing proximate the intermediate portion and pair of wheels rotating relative to the axle and the housing.

* * * * *